(12) United States Patent
Sparks

(10) Patent No.: US 8,733,642 B2
(45) Date of Patent: May 27, 2014

(54) SYSTEM, METHOD AND COMPUTER PROGRAM PRODUCT FOR FACILITATING SECURE COMMERCIAL TRANSACTIONS

(76) Inventor: John T. Sparks, Atlanta, GA (US)

( * ) Notice: Subject to any disclaimer, the term of this patent is extended or adjusted under 35 U.S.C. 154(b) by 0 days.

(21) Appl. No.: 13/414,508

(22) Filed: Mar. 7, 2012

(65) Prior Publication Data

US 2012/0173427 A1    Jul. 5, 2012

Related U.S. Application Data

(63) Continuation-in-part of application No. 12/357,047, filed on Jan. 21, 2009, now Pat. No. 8,152,059, which is a continuation-in-part of application No. 10/974,045, filed on Oct. 26, 2004, now Pat. No. 7,497,371.

(51) Int. Cl.
*G06K 5/00* (2006.01)
(52) U.S. Cl.
USPC ............................ 235/382; 235/380; 235/379
(58) Field of Classification Search
USPC ...................................... 235/379; 705/41, 43
See application file for complete search history.

(56) References Cited

U.S. PATENT DOCUMENTS

| 5,010,238 | A | * | 4/1991 | Kadono et al. | 235/379 |
| 5,354,974 | A | * | 10/1994 | Eisenberg | 235/379 |
| 5,590,038 | A | * | 12/1996 | Pitroda | 705/41 |
| 6,776,332 | B2 | * | 8/2004 | Allen et al. | 235/380 |
| 8,463,234 | B2 | * | 6/2013 | Lee et al. | 455/410 |
| 2004/0267664 | A1 | * | 12/2004 | Nam et al. | 705/41 |
| 2005/0065885 | A1 | * | 3/2005 | Gordon | 705/43 |
| 2008/0040273 | A1 | * | 2/2008 | Savage et al. | 705/43 |
| 2011/0272460 | A9 | * | 11/2011 | Drummond et al. | 235/379 |

* cited by examiner

*Primary Examiner* — Daniel Hess

(57) ABSTRACT

A secure financial transactions system generally includes a card that can be used a credit card, ATM card or debit card having a personal identification number (PIN) that can include a panic digit or panic PIN. The panic digit or panic PIN can be used to begin an emergency notification sequence including sending emergency signals and video transmissions from the commercial transactions machine. The card can include several biometric devices as well as financial transaction records. The card can include data to interact with data gathered from biometric devices on the ATM or POP devices. The card can then be interfaced with a personal computer. The card could also be made into other formats such as a ring, key chain, or other jewelry.

20 Claims, 2 Drawing Sheets

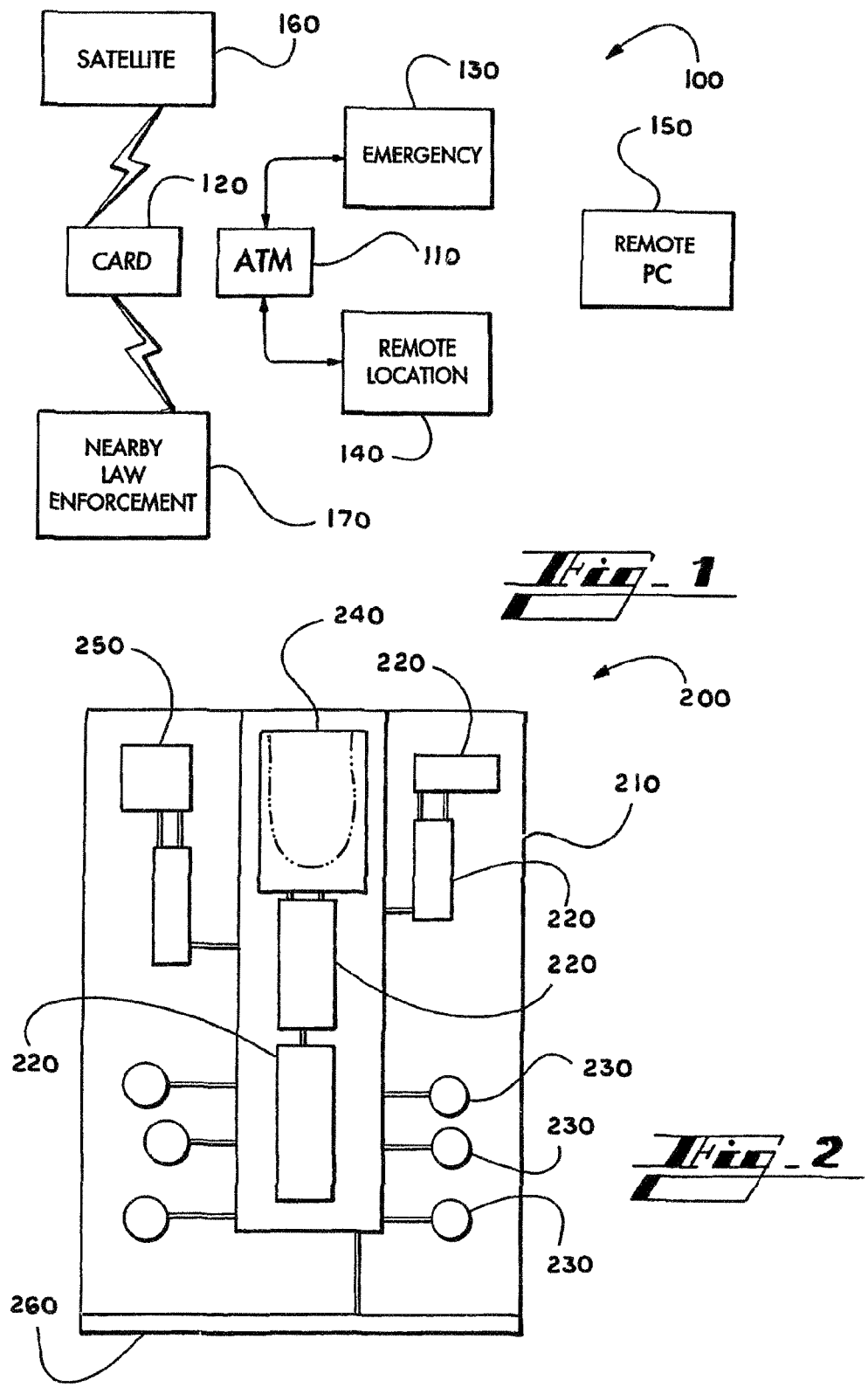

SYSTEM, METHOD AND COMPUTER PROGRAM PRODUCT FOR FACILITATING SECURE COMMERCIAL TRANSACTIONS

CROSS REFERENCE TO RELATED APPLICATIONS

This application is a continuation-in-part application and hereby claims priority to, and the benefit of, U.S. patent application Ser. No. 12/357,047, filed on Jan. 21, 2009, currently pending, which is a continuation-in-part of, and hereby claims priority to, and the benefit of, U.S. patent application Ser. No. 10/974,045, filed on Oct. 26, 2004, now U.S. Pat. No. 7,497,371, Issued on Mar. 3, 2009, and entitled "Secure Commercial Transactions System", on behalf of John T. Sparks, the entire disclosures of which are incorporated herein by reference.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE DISCLOSURE

1. Technical Field

The present disclosure relates generally to the field of commercial transaction systems, and more particularly to a secure commercial transaction systems, methods and computer program products, wherein a multi-feature transactional device enhances user safety, provides a means of user identify verification, minimizes risk of fraud, facilitates record keeping, and functions as a data collection tool for target marketing.

2. Prior Art

The present use of ATM cards, debit cards, credit cards, and the like create potential personal security hazards. For example, users at ATM machines can become robbery victims by having criminals force them to withdraw money. In addition, the loss of such cards can allow criminals to endlessly use the cards without knowledge to the true owner. Further, fraudulent use of counterfeit cards is becoming increasingly prevalent, wherein card numbers and other identifying information printed on cards is furtively collected and utilized to create counterfeit cards.

In addition to such security hazards, users of ATM cards, and the like typically received paper (soft) receipts when executing in-person commercial transactions. That is, a common occurrence in everyday life is the issuance and acceptance of a paper receipt as evidence of a commercial transaction. Such receipts include vouchers, sales slips, signed notices, paid bills, proofs of payment, statements, sales tickets, admittance, and cash register tapes. These items are used almost everywhere to provide a consumer and a merchant with some means of recording a commercial transaction to ensure that rights and responsibilities regarding the commercial transaction are honored between the parties through the transaction.

Currently, consumers, and merchants use paper receipts that must be retained not only until the purchase value has been received by the customer but also for future problems regarding claims and responsibilities with regards to the commercial transaction. For the consumer, maintaining many receipts over a period of time may be difficult. For the merchant, the issuance of a paper receipt almost guarantees that the merchant must create and maintain other paper records that match the paper receipt.

For example, in a typical purchasing transaction, a consumer may travel to a home supply store to buy building materials. After paying for some merchandise, the consumer will receive a paper receipt as proof of purchase. If the consumer has purchased some bulky items, such as lumber, the consumer may be required to proceed to a different location to pick up the lumber, such as a loading dock at the back of the store or at a nearby lumber yard. The consumer's purchase receipt serves as evidence of payment for the lumber and of the right to delivery of the lumber from an agent of the home supply store. Once the consumer has tendered the receipt, the agent may physically mark the paper receipt to show that the lumber has been delivered, and the lumber is given to the consumer.

The use of paper receipts in this situation creates inconveniences. The consumer must ensure that the paper receipt is not lost before the lumber is picked up, which is usually not difficult as the lumber would probably be picked up in a short amount of time. However, the consumer is required to keep the receipt in case the consumer desires to return any defective merchandise. As some stores may allow the return of certain merchandise after several months, the consumer may need to file the paper receipt in a special place to ensure that it is not lost.

The merchant also confronts inconveniences. The home supply store's purchase transaction system may update inventory records immediately upon the sale of the merchandise, even though not all of the merchandise has been removed from the stock. If the purchase transaction system is set up so that a lumber yard manager must enter a transaction into an electronic terminal to update the inventory records, and the lumber yard manager fails to do so, then the inventory records will not properly match the actual inventory.

As is familiar to most consumers, the maintenance and transfer of paper receipts for such purposes may be both cumbersome and annoying. Therefore, it would be useful to have a system, method, and computer program product for electronically transferring, inter alia, proofs of purchase or other documents related to commercial transactions. It would be further advantageous to have a system, method, and computer program product for transferring and storing detailed information concerning the status and details of a particular commercial transaction.

Additional disadvantages exist relative to currently available transaction cards. For example, a frequent card user is personally saddled with the task of collecting endless printed receipts if crosscheck of bank or credit statements is desired. Moreover, in most instances, even if the user does not desire a print receipt, the receipt is generated nonetheless. Countless tons of environmental waste are undoubtedly generated by ATM's alone.

BRIEF SUMMARY OF THE DISCLOSURE

In view of the foregoing background, it is therefore an object of the present disclosure to provide a system, method, and computer program product for providing secure commercial transactions. In general, the present disclosure relates to an ATM/credit/debit card that includes a microprocessor, memory, security devices, and financial transaction devices. As an ATM or debit card, a personal identification number (PIN) is included as with present ATM and debit cards. The PIN can be a set number of digits, say four. The user typically has two PIN's. One, the normal PIN, allows transactions without any special security function being triggered. The user also typically has another PIN, a "panic" PIN that triggers a series of security devices but appears to the user (or a criminal) to be functioning normally. The normal PIN can also be altered to a "panic" PIN by use of another digit to the normal PIN. This digit is the "panic" digit.

In a typical implementation, the user can use the four digit normal PIN to conduct normal financial transactions. However, to provide a security feature at ATMs or other point of purchase (POP) devices, if a criminal forces a user to withdraw money or forces the user to reveal the PIN, the user can key in the second "panic" PIN or the normal four digit PIN plus the fifth panic digit. The financial transaction proceeds as normal so as not to alert the criminal. However, by pressing the "panic" PIN or the "panic" fifth digit, the machine starts a series of protective actions, for example, sending an emergency message such as a 911 call to the local police that there is criminal activity at that location. A camera in the location can go into a higher resolution mode to obtain a better image of the scene. The camera can also go into a format so that only police can erase the image. In addition, the video can be emailed to an off-site facility to insure the retention of the images.

In another embodiment, the card includes a biometric finger print reader. The card includes a normal finger print data and a panic finger print data so that during normal transactions, the user uses the normal finger. During panic transactions, the user uses the panic finger.

The card can also include a cell-phone like transmitter that sends a signal when the panic PIN or the panic digit is pressed. This broadcast can be relatively short range so that it can be picked up by receivers on order to locate the card. The card can also include a global positioning device so that longer range instruments can be used to locate the card.

The card can also include other general security features to minimize likelihood of unauthorized use, to deter identity theft, and to prevent use of a lost or stolen card. For example, the card can include no imprinted numbers, such that the numbers and other identifying data is not readily apparent. The card number is preferably stored in the cards on-board memory, and further preferably in encrypted form in order to lessen the risk of identity theft. The card can also include biometric devices such as a finger or thumb print reader coded to the user's finger or thumb print, either right or left hand as selected by and set by the user. In a typical embodiment, the finger or thumbprint reader faces upward therefore requiring that the user's finger or thumb be placed on the reader in order for the card to operate. The card does not allow transactions without use of the specific user's finger or thumb. Use by other persons causes the card to start the security actions listed above. The card can also include a heartbeat reader or oxygen sensor to ensure that the user's finger or thumb is actually attached to the user.

In another implementation, a temperature reader can be used. In another implementation the biometric devices shall be placed at the ATM or other POP device. In this implementation, the card has certain data in its memory in a non-modifiable format, specific to the user such as finger print information as set by the user. For example, only the user knows which of his fingerprints is input into the card's memory thus which finger to use on the biometric device to make the card transaction occur normally. Unless the data on the card matches data gathered by the biometric device on the ATM or POP, the transaction does not occur and the card assumes unauthorized use (or attempted use) and triggers the above-mentioned security actions.

In order to prevent "false alarms" where the user mistakenly triggers the security actions, the card, the ATM, or the POP typically has a procedure to call off the actions.

The card can also function as a means of electronic record-keeping apart from printed receipts, and thus may include a process that records all financial transactions and receipts in the memory, facilitating record keeping by enabling transaction data downloadability. The card can be interfaced with a user's personal computer and interface with personal financial software and other software. The files in which the financial transactions are stored on the computer can be protected so that only the user can access the receipts. The receipts are generally non-modifiable, but are downloadable and erasable by the user. In an embodiment, the card can also include email notification to the user's computer each time a financial transaction is made. The email notification can be linked with a pending file so that when the user interfaces with the computer, a cross check is made with the emails and the downloaded financial transactions. The user can then be notified if there are any discrepancies or unauthorized use. The card could also be made into other formats such as a ring, key chain, or other jewelry.

In another embodiment, the card may be programmed to track the use thereof, such as by vendor frequency or category of goods and services, wherein if desired, such as according to the preferences of the user, targeted marketing could be received by the user according to such use.

In general, in one aspect, the disclosure features a commercial transactions system, including a commercial transaction machine, a commercial transaction card adapted to interact with the machine, an emergency contact system coupled to the commercial transaction machine, and a process located on the commercial transaction card, the process having instructions to process a personal identification number having N digits to perform a commercial transaction.

In one implementation, the commercial transaction machine is an n automatic teller machine.

In another implementation, the commercial transaction machine is a point of purchase machine.

In another implementation, the process further includes instructions to process a personal identification number having N+M digits to perform an interaction with the emergency contact system.

In another implementation, the instructions reside in a memory located on the commercial transactions card.

In still another implementation, the system further includes a microprocessor located on the commercial transactions card, the microprocessor being adapted to process the instructions.

In yet another implementation, the system further includes a biometric reader located on the commercial transactions card.

In another implementation, the biometric reader is a thumb or finger print reader. In another implementation, the biometric reader is a heartbeat sensor. In another implementation, the biometric reader is a blood-oxygen sensor.

In another implementation, the card can be programmed with two different finger prints.

In another implementation, a first finger print is a normal transactions fingerprint, the finger print being stored on memory on the card.

In another implementation, the second finger print is a panic finger print, the finger print being stored on memory on the card.

In another implementation, the process further includes instructions to process the panic finger print to perform an interaction with the emergency contact system.

In another implementation, the system further includes a high resolution camera connected to the commercial transaction machine.

In another implementation, the system further includes a computer adapted to process video signals from the camera.

In another implementation, the system further includes a process residing on the computer, the process including instructions for causing the video signals to be transmitted to a secure remote location.

In another implementation, the system further includes a transmitter located on the commercial transactions card.

In another implementation, the transmitter is short range.

In another implementation, the system further includes a global positioning unit located on the commercial transactions card.

In still another implementation, the process further includes instructions to record and process financial transactions involving the commercial transactions card.

In another implementation, the system further includes a remote computer adapted to interact with the commercial transactions card.

In another implementation, the remote computer includes a process to download the financial transactions records on the commercial transactions card.

In another implementation, the system further includes personal financial software located on the remote computer, the personal financial software being adapted to interact with the financial transaction records downloaded from the commercial transactions card.

In another implementation, the process on the commercial transactions card includes instructions to send a communication to the remote computer each time a commercial transaction is performed.

In another implementation, the system further includes a data structure located on the remote computer having data related to the communication sent to the remote computer.

In another implementation, the data structure data can be compared with data downloaded from the commercial transactions card.

In another implementation, the system further includes a process located on the remote computer, the process including instructions to make a notification signal if there are discrepancies between the data structure data and the data downloaded from the commercial transactions card.

In still another implementation, the system not only makes it difficult for the card to be used by any user other than the owner, but misuse or forced use under threat results in immediate notice to authorities, facilitating prompt police intervention in on-going crimes, preferably before serious bodily injury to the card user, and further facilitating quick identification and apprehension, as well as effective prosecution of criminals who misuse the card.

In yet another implementation, the system is comprised of the card itself, a card reader for operatively linking the card with a user's computer and/or with a transaction site PC, such as at a retail store; a hand-held card reader for remote transactions, such as for purchase of a beverage during airline travel; a broadcast device operatively linked to the card and the car of a user; a fob for remote broadcast, such as for if the card is discarded after a theft occurs but the user remains a captive victim; and operative and financial software.

In one implementation, the software may be configured to email data to the user from the transaction site in order to avoid the necessity of a print receipt and to minimize the necessary data storage capacity of the card.

One advantage of the disclosure is that it provides general financial interface capabilities that can be used with commercial transactions machines and the user's own computer.

Another advantage of the disclosure is that it includes biometric devices to insure that the user is the only person who can use the card.

Another advantage of the disclosure is that it includes a discreet emergency notification PIN.

Other objects, advantages and capabilities of the disclosure will become apparent from the following description taken in conjunction with the accompanying drawings showing the preferred embodiment of the disclosure.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

It is noted the purpose of the foregoing abstract is to enable the U.S. Patent and Trademark Office and the public generally, especially the scientists, engineers and practitioners in the art who are not familiar with patent or legal terms or phraseology, to determine quickly from a cursory inspection the nature and essence of the technical disclosure of the application. The abstract is neither intended to define the disclosure of the application, which is measured by the claims, nor is it intended to be limiting as to the scope of the disclosure in any way.

BRIEF DESCRIPTION OF THE SEVERAL VIEWS OF THE DRAWING

The novel features believed to be characteristic of this disclosure are set forth with particularity in the appended claims. The disclosure itself, however, both as to its organization and method of operation, together with further objects and advantages thereof, may best be understood by reference to the following description taken in connection with the accompanying drawings in which:

FIG. 1 illustrates a system level diagram of an embodiment of a secure commercial financial transactions system;

FIG. 2 illustrates an embodiment of a secure commercial transactions card; and

Figure 3:
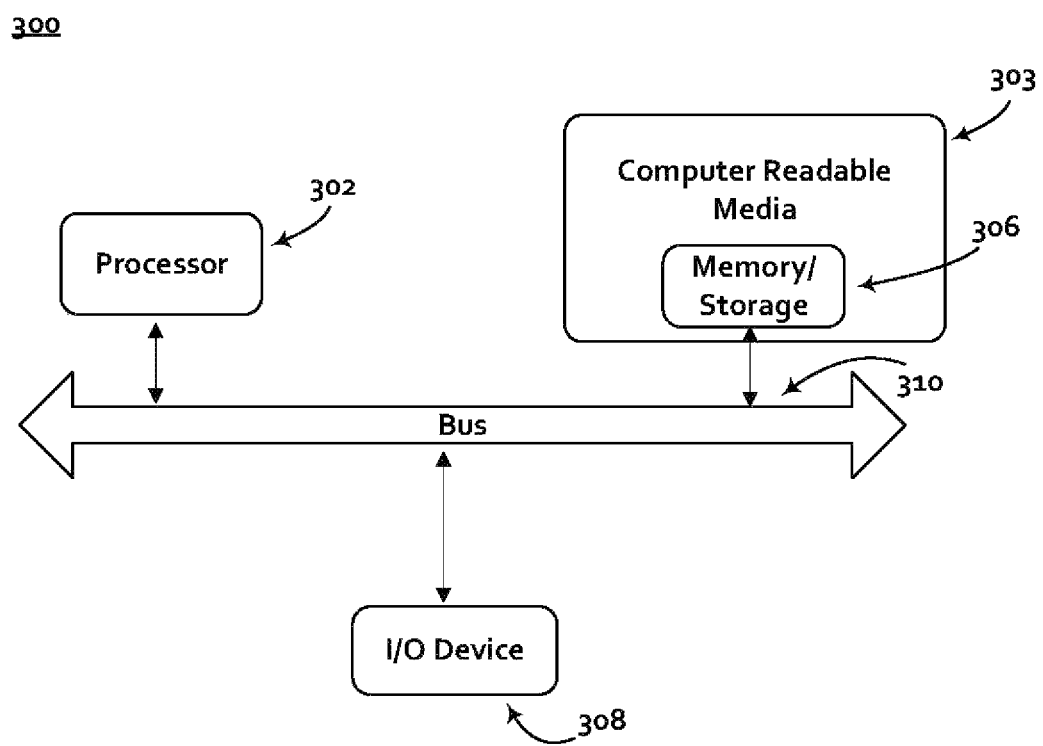
FIG. 3 is a schematic block diagram of an exemplary computer system useful for implementing the present disclosure.

Those skilled in the art will appreciate that the figures are not intended to be drawn to any particular scale; nor are the figures intended to illustrate every embodiment of the disclosure. The disclosure is not limited to the exemplary embodiments depicted in the figures or the shapes, relative sizes or proportions shown in the figures.

DETAILED DESCRIPTION OF THE DISCLOSURE

The present disclosure will now be described more fully hereinafter with reference to the accompanying drawings, in which a preferred embodiment of the disclosure is shown. This disclosure may, however, be embodied in many different forms and should not be construed as limited to the embodiment set forth herein. Rather, this embodiment is provided so that this application will be thorough and complete, and will fully convey the true scope of the disclosure to those skilled in the art. Like numbers refer to like elements throughout the figures.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "present disclosure" merely for convenience and without intending to voluntarily limit the scope of this application to any particular disclosure or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The below disclosed subject matter is to be considered illustrative, and not restrictive, and the appended claims are intended to cover all such modifications, enhancements, and other embodiments which fall within the true scope of the present disclosure. Thus, to the maximum extent allowed by law, the scope of the present disclosure is to be determined by the broadest permissible interpretation of the following claims and their equivalents, and shall not be restricted or limited by the foregoing detailed description.

The system, method, and computer program product of this disclosure is referred to generally in FIGS. 1-3 by the reference numeral 10 and is intended to provide a system, method, and computer program product for facilitating a secure commercial transaction.

Referring to the drawings wherein like reference numerals designate corresponding parts throughout the several figures, reference is initially made to FIG. 3. In one embodiment, the disclosure is directed toward one or more computer systems capable of carrying out the functionality described herein. An example of a computer system 300 is shown in FIG. 3. Computing device 300 includes one or more processors or processing units 302, one or more computer readable media 303 which can include one or more memory and/or storage components 306, one or more input/output (I/O) devices 308, and a bus 310 that allows the various components and devices to communicate with one another. Computer readable media 303 and/or one or more I/O devices 308 can be included as part of, or alternatively may be coupled to, computing device 300. Bus 310 represents one or more of several types of bus structures, including a memory bus or memory controller, a peripheral bus, an accelerated graphics port, a processor or local bus, and so forth using a variety of different bus architectures. Bus 310 can include wired and/or wireless buses.

Memory/storage component 306 represents one or more computer storage media. Component 306 can include volatile media (such as random access memory (RAM)) and/or nonvolatile media (such as read only memory (ROM), Flash memory, optical disks, magnetic disks, and so forth). Component 306 can include fixed media (e.g., RAM, ROM, a fixed hard drive, etc.) as well as removable media (e.g., a Flash memory drive, a removable hard drive, an optical disk, and so forth).

The techniques discussed herein can be implemented in software, with instructions being executed by one or more processing units 302. It is to be appreciated that different instructions can be stored in different components of computing device 300, such as in a processing unit 302, in various cache memories of a processing unit 302, in other cache memories of device 300 (not shown), on other computer readable media, and so forth. Additionally, it is to be appreciated that the location where instructions are stored in computing device 300 can change over time.

One or more input/output devices 308 allow a user to enter commands and information to computing device 300, and also allows information to be presented to the user and/or other components or devices. Examples of input devices include a keyboard/keypad at an ATM, a cursor control device (e.g., a mouse) at a self-checkout POS terminal, a microphone linked to a kiosk having a voice command interface, a scanner, a touch screen interface and so forth. Examples of output devices include a display device (e.g., a monitor or projector), speakers, a printer, a network card, a display screen and so forth.

Various techniques may be described herein in the general context of software or program modules. Generally, software includes routines, programs, objects, components, data structures, and so forth that perform particular tasks or implement particular abstract data types. An implementation of these modules and techniques may be stored on or transmitted across some form of computer readable media. Computer readable media can be any available medium or media that can be accessed by a computing device. By way of example, and not limitation, computer readable media may comprise "computer storage media" and "communications media."

"Computer storage media" include volatile and non-volatile, removable, and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embody computer readable instructions, data structures, program modules, or other data in a modulated data signal, such as carrier wave or other transport mechanism. Communication media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media. Combinations of any of the above are also included within the scope of computer readable media.

Generally, any of the functions or techniques described herein can be implemented using software, firmware, hardware (e.g., fixed logic circuitry, system on a chip), manual processing, or a combination of these implementations. The terms "module" and "component" as used herein generally represent software, firmware, hardware, or combinations thereof. In the case of a software implementation, the module or component represents program code that performs specified tasks when executed on a processor (e.g., CPU or CPUs). The program code can be stored in one or more computer readable memory devices, further description of which may be found with reference to FIG. 3. The features of the managing requests based on request group techniques described herein are platform-independent, meaning that the techniques can be implemented on a variety of commercial computing platforms having a variety of processors.

Although the subject matter has been described in language specific to structural features and/or methodological acts, it is to be understood that the subject matter defined in the appended claims is not necessarily limited to the specific features or acts described herein. Rather, the specific features and acts described herein are disclosed as example forms of implementing the claims.

Suitable processors include, by way of example, both general and special purpose microprocessors. Generally, a processor receives instructions and data from read-only memory and or RAM. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing may be supplemented by, or incorporated in, specially designed application specific integrated circuits (ASICs).

Referring now to FIG. 1 a commercial transactions system 100 is illustrated. In general, the commercial transactions system 100, includes a commercial transaction machine 110, a commercial transaction card 120 adapted to interact with the machine 110 and an emergency contact system 130 coupled to the commercial transaction machine 110 with a process located on the commercial transaction card 120, the process having instructions to process a personal identification number having N digits to perform a commercial transaction. The commercial transaction machine 110 is typically an automatic teller machine or a point of purchase machine. The process further includes instructions to process a personal identification number having N+M digits to perform an interaction with the emergency contact system 130. Typically, the instructions reside in a memory located on the commercial transactions card 120. The system 100 can also include a microprocessor located on the commercial transactions card 120, the microprocessor being adapted to process the instructions.

The system 100 can also include biometric reader located on the commercial transactions card 120. The biometric reader is a thumb or finger print reader, a heartbeat sensor, a blood-oxygen sensor or a temperature reader.

The system 100 can further includes a high resolution camera connected to the commercial transaction machine 110 and a computer adapted to process video signals from the camera. Typically, the system 100 further includes a process residing on the computer, the process including instructions for causing the video signals to be transmitted to a secure remote location 130.

The system 100 can also include a variety of locator capabilities. For example, the system 100 can includes a short range transmitter located on the commercial transactions card 120. The system 100 can further include a global positioning unit located on the commercial transactions card 120. In general, the card 120 can be in communication with any remote device such as a satellite 160 or local law enforcement 170.

The system 100 may also include not only direct read capabilities, such as for when the card is inserted into or physically scanned by a transaction processing device, but additional means of communication, such as wireless connectability, for example, via BLUETOOTH, infrared, or any other appropriate means of verifiable wireless communication, may also or alternately be utilized to foster transactional communication with a transaction processing device, such as an ATM or other such device.

The process in the system 100 can further include instructions to record and process financial transactions involving the commercial transactions card 120. The system 100 can further includes a remote computer 150 adapted to interact with the commercial transactions card 120. The remote computer 150 can typically include a process to download the financial transactions records on the commercial transactions card 120. The computer 150 can further include personal financial software, such as Quicken located on the remote computer 150, the personal financial software being adapted to interact with the financial transaction records downloaded from the commercial transactions card 120.

The process on the commercial transactions card 120 can also include instructions to send a communication to the remote computer 150 each time a commercial transaction is performed. The system 100 can further include a data structure located on the remote computer 150 having data related to the communication sent to the remote computer 150. In general, the data structure data can be compared with data downloaded from the commercial transactions card 120. The system 100 can further include a process located on the remote computer, the process including instructions to make a notification signal if there are discrepancies between the data structure data and the data downloaded from the commercial transactions card 120.

In one embodiment, a method for facilitating a secure commercial transaction preferably includes the steps of: providing a transactional device including a microprocessor, a data memory storage, and a transmitter; and confirming a user identification of the transaction device and thereby activating operation of the transaction device. In this manner, the step of confirming the user identification comprises one step selected from a group of steps including receiving a user input of either a first operational signal and comparison of the user input with a first operational user identification data stored in the data memory storage on the transactional device for activation of a first operational mode, and receiving a user input of a second operational signal and comparison of the user input with a second operational user identification data stored in the data memory storage on the transactional device for activation of a second operation mode. The method may further include the step of receiving, from the second mode of the transactional device, an automated transmission initiated from the transmitter.

In accordance with these and other objects, provided is a system for distributing and generating, at a remote site, marketing incentives/offers comprising a centrally located repository of electronically stored marketing incentive/offer data, transmission mechanism operatively associated with the centrally located repository for providing data communication between the repository and a plurality of remote user computer (e.g., ATM card and the like) operatively associated with the transmission mechanism. The remote user computer in the present disclosure comprises interface mechanism for providing user interaction with the centrally located repository, a memory, and a marketing data management program. The marketing data management program is implemented by the computer for requesting marketing data from the centrally located repository, for storing in the memory marketing data transmitted from the centrally located repository, and for generating printable marketing data from the stored marketing data. The remote user computer also comprises a marketing output buffer operatively associated with the data management program for storing printable marketing data generated by the marketing data management program.

The system may enable the user to transmit electronically the printable marketing data from the marketing output buffer to the centrally located repository or directly to the retailer for electronic redemption.

As a result of the present disclosure, a user of the remote computer (i.e., ATM card and the like) is able to request marketing data to be transmitted from the centrally located repository, and the user is able to instruct his computer to display/print or electronically transfer marketing incentives/offers generated from the transmitted marketing data. In particular, the user's computer assembles marketing incentives/offers for electronic presentation by using two data components; (1) fixed marketing data which is transmitted to the user's computer during an initialization or "sign-up" process and which remains stored on the user's computer for subsequent marketing generation, and (2) variable marketing data which is transmitted to the user's computer whenever he requests marketing data from the central repository. In addition, a retailor or other seller can electronically communicate marketing incentives/offers to the user by monitoring purchasing habits/patterns over periods of time.

Additionally, the marketing data management program of the present disclosure operates in conjunction with the remote computer to allow the user to select and store certain desired marketing data from the marketing data transmitted by the centrally located repository and electronically view/print marketing data as selected. The marketing data management program also allows the user to generate a shopping list which is correlated to the marketing date electronically stored/printed for subsequent redemption.

In one embodiment, the data exchange capabilities provided by the transmission medium between the remote computer and the central repository allow the automatic transfer of valuable information from the remote computer to the central repository and, ultimately, to the marketing distribution and issuance centers. Information related to the marketing data selected, stored, and printed can be supplied to the marketing distributors and issuers, which can also use information obtained from the various retail stores as to which marketing data were actually redeemed in order to more intelligently market subsequent data and target incentives/offers in a more cost effective manner.

The data exchange capabilities are further advantageously utilized in the present disclosure to allow, via the central repository, the updating of marketing data stored in the user's remote computer without required interaction from the user if the user is online. In particular, the central repository can delete expired marketing data from the remote computer's marketing database and can vary the amount of redemption value of a non-expired marketing incentive/offer if so desired. The capability for the updating and deleting of marketing data within a user's computer is programmed in the user's computer such that no further interaction with the central repository is required for such marketing data to be deleted or updated.

FIG. 2 illustrates an embodiment of a secure commercial transactions card 200. The card 200 can generally include a main body 210 generally being comprised similarly to conventional credit cards. The card 200 can include a microprocessor and memory 220. The card 200 can also include one or more batteries 230. The card 200 can further include biometric devices 230 and a transmitter 250. The card 200 typically further includes a reader interface 260. The embodiments described herein typically anticipate the embodiment of the card 200 as described above. However, it is understood that several modifications can be made that are within the scope of the embodiments described. For example, it is intended that card 200 is a multi-feature transactional device that enhances user safety, provides a means of user identity verification, minimizes risk of fraud, facilitates record keeping, and functions as a data collection tool for target marketing.

ATM and POP Security Features

As described above, there are several features of the secure commercial transactions system that can be implemented. The following description describes some more specific embodiments of the features. The card can offer some protection from fraud and misuse and armed robbery at ATM machines as explained below. An exemplary purpose of the card is to insure security of credit card/ATM transactions, to offer electronic record keeping and receipts, and to facilitate record keeping by transaction download ability. The security devices are to not only make it difficult to use except by the owner, but also give notice to authorities of misuse or use under threats that generally facilitate prompt police intervention in on-going crimes before the situation escalates and hopefully protect the victim from further violence, quick identification, and apprehension of the criminals who misuse the card and effective prosecution of criminals who misuse the card.

As stated above, in a typical implementation, the ATM security incorporated in the card is as follows: The card works in any commercial transactions machine such as an ATM and has a 3-6 digit PIN. An entirely different number or merely the last number, to be chosen by the customer, is a code. If the customer uses his regular code number, the transaction is normal. If the customer uses the "panic" code number, the transaction appears to be normal in all ways to the customer/criminal at the ATM. (The criminal has no notice whatsoever that the "panic" number was used.)

In another embodiment, the ATM/POS or the card can be equipped with a biometric reader such as a finger print reader. When the user first obtains the card, he or she chooses which one of their fingers is the normal transaction finger and which finger is the panic finger. The card stores the normal and panic finger print data and is optionally encrypted on the card's memory. The data is stored and the user is unable to alter it once it is stored. In addition, an unauthorized user is not able to retrieve the finger print or other data from the card's memory.

If the user uses the "normal" fingerprint or regular PIN during the transactions, the transactions are normal. If the user uses the panic PIN or panic finger print, the transaction appears normal in all ways to the unauthorized user or criminal at the ATM or POP. The unauthorized user or criminal has no notice whatsoever that the panic finger or PIN has been used.

The use of the "panic" number or finger print causes a number of things to happen, including but not limited to the following:

(1) The ATM records an incident code on the card's memory chip and the incident code is broadcast. According to an alternate embodiment, it is envisioned that the incident code may be broadcast by a related transmitter in the user's vehicle, a key fob, and a cellular telephone in lieu of and/or in addition to the card. The ATM also sends a message via a preset phone number or email address to the nearest Police (or 911) station that a crime is in progress at that particular ATM. The ATM also transmits data on the name description and other information of the user. The data can be as detailed as the bank or user wants and can include such information as photos, automobile descriptions, phone numbers, age, race, height, weight, and the like.

(2) The camera at the ATM automatically goes into a clear, higher resolution mode so that the entire area is clearly visible on the recording. Also, the recording is automatically saved until it is erased by the police. Digital copies are made and sent via email to an off-site storage facility to insure retention of photos.

(3) The card includes a cell phone like transmitter. Upon use of the card with the "panic" finger print or code, a signal begins to be broadcast that can be picked up by the police. The signal is just strong enough for reception out a few miles (so that it can either be picked up by the police or by cell phone towers). This feature helps locate the card and possibly the victim. Typically, the cell phone transmitter is implemented with existing technology. In one embodiment, the card can include a half-duplex transmitter broadcasting in normal FM band as a cell phone. In one implementation, the transmission can be in GSM or other cell phone standards. It is envisioned that the transmitter element of the card may have a plurality of applications. For example, a child could be tracked by a parent, or a vehicle could be tracked by its owner, both either openly or covertly. Such embodiments would likely be most effectively incorporated into a rechargeable form of the card.

The card typically does not need to continuously broadcast. Once the panic mode is started, the ATM gives the first notice to the police, who receive all the available data regarding the fact that the crime is being committed, the location of the ATM, and the data regarding the user, including the ID data on the card. The broadcast from the card is merely the incident code and the ID. The purpose of the incident code is to insure that the broadcast is sent to the correct police station (or other authority). This broadcast can be sent every few minutes. Thus, with the starting point of the initial ATM transmission and interim broadcasts that are received by the cell towers, the police are able to locate the following: (a) the general direction of travel of the card (and presumably the criminal); and (b) the cell in which the card is located after any broadcast.

The exact location of the card can be determined as follows: Using the data of the initial ATM and subsequent broadcasts, the police can plot the travel of the card. Inasmuch as the broadcasts are merely radio signals, once the police limit the search to one cell, they can use multiple units with directional receivers to triangulate the location of the card.

In a typical embodiment, the card's panic function is a one-time only use. Once the panic function is used, the card is replaced to insure that the next time it is needed, the panic function is fully powered. This feature eliminates the need to recharge the battery (but not the need to check the power each time it is used at a POS and replaced if the power is low). In another embodiment, the card can include a rechargeable battery and that implements a technology without a memory problem. Each time the user uses the card, the ATM or home reader checks the battery for its charge and if it needs charging, the computer or other reader charges the battery, or notifies the user that the battery needs charging. The user can also receive a status report of the battery life and notice to replace the card when the battery approaches the end of its useful life.

Another aspect of the card is its need to not continually broadcast. As such, the battery life is preserved and the signal strength of the broadcast remains strong. In one embodiment, the card can include a capacitor to store charge in order to concentrate the power and fire the broadcast is a very short, powerful burst.

(3) Because the idea is to make sure the criminal is not notified of the use of the "panic" finger or code, and because some criminal may have sufficient technology to pick up a broadcast signal, the card, after any use, sends out regular signals. If the "panic" finger or code is not used, the signal is merely a decoy.

(5) As described above, the card can have a normal PIN, normal finger print, and panic finger print. Using the card with a panic finger causes a series of events. In a typical embodiment, the card can enable the ATM or other commercial transaction machine to send a crime code to the police so that the police have notice that the crime is in progress at the machine. The machine can also send the card user's name, description, automobile type, and the like so that the police have a better chance to locate the victim. The camera can be programmed to save the recording and create higher resolution and a wider view.

(6) In a situation where the panic finger or code has been mistakenly used, the user can use his normal finger or code to cancel the panic functions. If the user uses the panic finger or code but does not recognize that he used it, the user cannot stop the panic function. In such a situation, the user can pay a fee similar to home security users who mistakenly and repeatedly have false alarms. In another embodiment, a discreet signal can be sent to the user's cell phone, pager or other PDA that is innocuous for each panic mode or normal mode, and if there is an error, the user can then send the normal code to stop the panic function.

(7) In another embodiment, once the card is activated, a similar activation can occur in the user's car. This event helps to eliminate the possibility that the broadcast ceases if the criminal discards or destroys the card after the first use. If the criminal does throw away or destroy the card, the user is protected because his car starts the broadcast. The device in the car includes a battery charged by the car's electrical system. This feature prevents the criminal from disconnecting the battery. The car broadcasts similar signals but further includes an identifier within the broadcast to identify the broadcast as coming from the car as opposed to the card. In another embodiment, a separate card or device (such as a key chain) can similarly broadcast a signal. The secondary device can be any suitable form factor such as lipstick, face powder compact, key chain fob, money clip, or some device in the purse lining. In one implementation, an available communications service such as On-Star can be used as the communications medium. In still another embodiment, the card can be used as an anti-theft device in which the car is equipped with a reader and it is necessary to scan the card to start the car.

(8) In another alternate embodiment, the available balance to a user's account could be reset by initiation of the "panic" mode at an ATM, wherein a balance inquiry would report the new, lower reset total to prevent detection by the criminal. In such an embodiment, it is considered that the reset could be configured to require intervention by a bank representative or by law enforcement for activation. When activated, such a reset would limit the funds available for withdraw over a period of days, rather than the traditional daily limit, and yet would appear to the criminal to simply be an exhaustion of deposited funds.

General Security Features

The card has general security devices on it as well, in order to minimize likelihood of unauthorized use, to deter identity theft, and to prevent use of a lost or stolen card. In a typical embodiment, the card does not have numbers pressed into it; that is, the card may include no imprinted numbers or identifying data, such that no owner or account information is visibly apparent. Instead, all the numbers and identifying data are imbedded in the chip memory, in encrypted form. As stated, this feature aids to prevent anyone from obtaining the numbers directly from the card, whether lost, stolen, or otherwise.

The additional security devices are a thumb or finger print reader coded to the individual customer's thumb or finger print as set by the user. The thumb or finger print reader is generally centered in the card and it is inserted into the reader, finger or thumb print reader up. The user can use either finger or thumb as they choose at the beginning (it is set by the issuer at the time of issue).

In one embodiment, a finger or thumb reader can be placed at the transaction site. The card can also include the data of the finger or thumb print of the user. The reader at the transaction site can read the print from the customer's thumb or finger and compare that data to the data on the card. In order for the transaction to commence, the data has to match.

In other embodiments, the reader can be imbedded on the card itself so that it functions only with a particular user. This feature generally simplifies the transaction site functions and also allows the card to be used at the users PC site without having to have a reader at the PC. Similar to a reader on the ATM, the reader on the card includes both a normal and panic finger.

Other general security devices include a heartbeat reader. This implementation arises from fear that a criminal could remove the thumb or finger of the customer and use it to activate the card (assuming that the criminal knows which finger or thumb to use). A temperature reader or blood-oxygen sensor could further be implemented. Therefore, unless the thumb used to activate the card includes a heartbeat, the card does not function and goes into panic mode.

In another implementation, the card can be programmed so that it does not function if it is damaged by magnetic fields, unauthorized programming, and the like. If the card does not receive the required security data as encrypted by the user, the card does not function. Furthermore, as part of other general security features, any use of the card that fails because of a violation of the general security devices described above can cause the card to go into a panic mode as described herein. This feature functions to assist the apprehension of the person attempting to misuse the card or use the card without authorization.

Even further, in another implementation and/or embodiment the card may be adapted to broadcast its location via global positioning satellite (GPS) functionality, such that the card could have a GPS receiver functionally related thereto, wherein the GPS receiver could be further adapted to broadcast its location in a police designated frequency, or could utilize a standardized frequency.

Financial Paperwork and Other Software Interaction

To avoid the retaining of receipts and the input of data on home or business financial programs, several features of the system can be implemented. There are programs that automatically download some information regarding credit card transactions, but these systems can be limiting. In addition, several paper receipts must be input. The card can keep electronic receipts from all transactions. When the customer gets home or back to the office, he puts the card into his PC and the data from the card downloads into his PC and automatically goes into his financial software (Quicken, for example). If he needs to add additional information, category information for example, then he can within the Quicken data file. Thus, the card may function as a means of electronic recordkeeping, apart from printed receipts, wherein an on-board process records all financial transactions and receipts into memory, facilitating recordkeeping by enabling transaction data downloadability.

Regarding receipts, the card includes electronic receipts that are not modifiable by the customer. This feature allows the customer to prove purchase should he need to return merchandise or prove that he paid something. These receipts can only be downloaded into a read only file in the PC. These downloaded receipts are typically in a protected file that cannot be manipulated by the customer. Additional security and records protection are available in digital, off-site recording of the customer's data.

Another alternate application of use in lieu of and/or in addition to financial data management is medical information management. That is, medical information and records could be stored on the card, in non-alterable form, wherein access protocols may be defined to enable access to the data by medical personnel and/or emergency workers.

Another aspect of the card is an email cross-check. When the card is used, it sends via email a notation of the charge (vendor, date, and amount) to the PC of the customer. It places the notation in a pending file and when the card is placed in the PC reader at the customer's home, the computer compares the email data to the data from the card. If there are discrepancies, then the customer is notified by the PC so that the discrepancy can be analyzed and corrected. Thus, in one implementation, the software may be configured to email data to the user from the transaction site in order to avoid the necessity of a print receipt and to minimize the necessary data storage capacity of the card, wherein, if such an option is operatively selected by the user, no on-board memory storage would occur during a given transaction, but rather an email record would transmit automatically.

The key aspects of this device are security and ease of gathering and recording of transaction information. All of the features of the system can be embedded into a ring or key chain device or other small jewelry. In that device, the ring could obtain power from the reader at the retail outlet or the home PC when the device is used. In the ring device, the reader part is typically on the palm side, perhaps a raised square. Further, any one or more of the beneficial aspects and functions of the card device and system, as described herein, may be incorporated into a cellular telephone, other personal data assistant device, and/or handheld computer.

Additionally, it is considered that the card described herein could serve as a platform for a plurality of credit accounts of a user. For example, a user's bank issued credit card data may be stored in the card, along with other credit card data, wherein at the time of purchase, the user may select which credit card account to use for the transaction.

Still further, the card may be programmed to track the use thereof, such as by vendor frequency or category of goods and services, wherein if desired, such as according to the preferences of the user, targeted marketing could be received by the user according to such use.

The systems described above can be used by a variety of users. For example, those people who keep electronic financial data benefit from the use of the card. Banks can benefit from the card given the inherent safety features. Another example of people who can benefit are those who use paperless transactions. An additional reader, such as a handheld reader, can be provided with the system so that organizations such as airlines can accept the card and use the reader to scan the card. The data can be sent to the airplane's computer and downloaded to the airport where the date can be processed by the financial institution.

The device can include a suitable biometric reader such as a finger print, palm, iris reader, or the like. It is understood that there are various people and organizations that can implement the embodiments described herein. Further, it is preferred that the user may have the option to select which body part, such as which digit, shall be utilized for "normal" transactions, and which is for "panic" transactions. According to such an embodiment, following programming of the selected identifying biometric data, such data is preferably inaccessably encrypted on the card, wherein alteration is not enabled. Thus, if the user wishes to change the identifying biometric data, a new card must be issued and programmed.

The software techniques and methods discussed above can be implemented in digital electronic circuitry, or in computer hardware, firmware (as discussed), software, or in combinations of them. Apparatus may be implemented in a computer program product tangibly embodied in a machine-readable storage device for execution by a programmable processor; and methods may be performed by a programmable processor executing a program of instructions to perform functions by operating on input data and generating output.

Further embodiments may advantageously be implemented in one or more computer programs that are executable on a programmable system including at least one programmable processor coupled to receive data and instructions from, and transmit data and instructions, to a data storage system, at least one input device, and at least one output device. Each computer program may be implemented in machine language or assembly language which can be assembled or translated, or a high level procedural or object-oriented programming language, which can be complied or interpreted.

In one embodiment, the disclosure contemplates each customer carrying a specially issued customer card (e.g., all-in-one electronic ATM card and the like) which is able to be interrogated by a wireless interrogation mechanism as the customer enters retail, or other, establishments. Upon interrogation, the customer card automatically responds and may provide the system with at least a customer identification number (a customer code) that is unique to that particular customer. As an option, once the customer code is recognized by the system, a videographic image may be taken of the customer, and an alert notification is provided to various point-of-sale terminals, store workstation terminals, mobile terminals, and the like, which might populate the establishment. The alert notification might take a variety of forms, and be effected in a variety of ways, but however made, the alert informs the establishment's staff of the presence of the customer. The customer's current videographic image may be made available to the establishment staff so that they can recognize the customer without regard to any changes in that customer's personal appearance.

In addition to providing a customer code in response to an interrogation signal, the customer card might also be configured to transmit pertinent data relating to the customer such as the customer's name and demographic profile information, and that customer's shopping transaction history information along with accrued loyalty or incentive points. Demographic profile information, such as a customer's family status, age, gender, and various personnel merchandise preferences such as merchandise color, clothing style, a customer's hair, eye, and skin color, preferred trade or brand names, and the like, are all particularly useful to a commercial establishment in determining how best to provide prompt, effective personalized services to a customer considering a transaction. Various items of merchandise being considered for purchase might be compared to previously purchased items and to a customer's physical characteristics, in order to provide a basis for deciding whether or not the considered item would appropriately match the, for example, color, and style characteristics of the previously purchased item.

As will be described in greater detail below, customer profile, and demographic data might be incorporated into the customer card's memory storage and transmitted to a store server in response to initial interrogation by the system. Alternatively, this information might be maintained in a central database residing in the server, or a central host computer system. A personal profile, demographic data, and transactional history record, for each customer, is identified to each customer's personal code. As that customer enters the establishment, and provides a customer code in response to interrogation, the code is matched to that customer's data record, the data is retrieved, and the data record, along with the customer's current videographic image (if available), is forwarded to the floor terminals for use by the staff.

Thus, customer recognition information, along with customer specific preference information, whether received from a wireless customer card or from an establishment's server system, are provided to in-store personnel and enable the in-store personnel to identify important, or VIP, customers as soon as they enter a particular establishment. In-store personnel are able to greet a customer with the customer's name and are able to provide appropriate shopping advice and determine what types of promotional items might be presented to this particular customer on the basis of the received customer information.

The system and method according to the disclosure further allows a transaction history database to be updated and maintained in real-time, thus making a customer's most recent transaction data available to the establishment for the purpose of computing loyalty or incentive points based on a running total of a particular customer's purchases, allocation of in-store promotional coupons, and the like. The system and method according to the disclosure provides a customer with a convenient, transportable mechanism for conveying accurate shopping transaction data from point-to-point in a multi-department commercial establishment or between stores in a chain. Access to real-time customer transaction information allows a retail facility to use a customer's latest transaction information for promotional purposes and/or providing prompt, effective personalized recommendation services to a customer considering a transaction (e.g., marketing incentives/offers via email, snail mail, etc.).

For in-store shopping, the system and method according to the disclosure contemplates the storage of a customer's personal information, demographic profile and shopping transaction history data in a convenient and readily transportable form, such as a credit card shaped, smart card-like customer card which a customer is able to use to interface with various in-store POS or hand-held terminals when making a purchase transaction. Once a transaction is completed, the transaction data, including the name and other identification information for each item, the price for each item and any other information which is pertinent to a commercial establishment's promotional considerations, is entered into a shopping transaction history file which might be further replicated to the customer's card. Item identification information includes such identification indicia that a store's sales personnel might use at some later date in order to fully identify a merchandise item or transaction by its various characteristics. Once this latest transaction information is entered into a customer's transaction data file, the customer may visit other departments in a multi-department store or may visit other stores in a chain and use their card to effect other, additional transactions.

It will be appreciated that a retail store or other commercial establishment equipped with the system and method of the present disclosure, is able to provide a significantly enhanced degree of personalized service to customers that make their purchase transactions using such a card. Customer loyalty is promoted and enhanced by providing an effective mechanism for immediately allocating incentive award points, store coupons, and the like, towards a particular purchase. In addition, such a system and method provides for effective, real-time collection of recent purchased data so that promotional recommendations and compatibility evaluations can be performed with respect to purchase decisions contemplated during subsequent shopping activities.

In yet another embodiment of the present disclosure, an e-receipt database may be included and contains different types of information associated with e-receipts, such as help files, merchant information, product use, and installation, etc. The customer card may receive an e-receipt from a merchant system and direct the e-receipt to an e-receipt application. As a non-limiting example, the card may interface with the merchant system through a merchant scanner. Such a merchant scanner may be similar to a barcode scanner normally found connected to electronic cash registers. The merchant scanner also may be similar to a smart card reader, or some other type of card reader that may receive and transmit e-receipt data and associated information with the card.

In an embodiment, the merchant scanner may send and receive information to and from a merchant server through a merchant station (e.g., POS terminal). This information may include purchase applications, inventory applications, etc. The merchant station may contain an input device, such as a keyboard, and an output device, such as a display, that allows the merchant or merchant's agent to interact with the transaction system. As an option, a user station may contain an input device, such as a keyboard, and an output device, such as a display, that allows a consumer to enter information that may be necessary for using the smart card, such as a Personal Identification Number (PIN), code, etc. In this manner, the consumer station may resemble systems that are frequently found in supermarket, retail checkout stations. The merchant server may read and write to a transaction database, which records information concerning user purchases and claims for products and services from the merchant.

In an embodiment, users can opt-out of the data collection entirely and the transmittal of information to the stores for privacy purposes. That is, data storage can reside both on a central database—managed by a service provider/merchant—as well as reside on the card. The storage on the card will be automatic whereas the storage on the central database will be optional (e.g., user elects to opt-in to have his/her data storage on the central database).

In one embodiment, use of the e-receipts provides purchase confirmations and other purposes on the card, which has storage capacity for storing e-receipts and other related information in a non-volatile manner after receiving the e-receipt from data processing system.

The transmittal of an e-receipt may include a digital signature to ensure that the user of the card has been properly identified as a particular customer known or previously identified within the merchant's commercial transaction system. The digital signature may encode the information on the card so that only the owner of the card, or only the merchant that placed the information on the card, may read the particular electronic documents on the card. The digital signature also protects the integrity of the document by preventing and/or detecting changes to the e-receipt. The e-receipt may include any additional information required to complete the electronic purchase other than information concerning the product or service being purchased. For example, the e-receipt may include a consumer or purchase identification number, a merchant or vendor identification number, and other information necessary for identifying the particular commercial transaction to distinguish it from other commercial transactions within the merchant system.

As another example, the e-receipt may include the credit card number that was used in the original commercial transaction. Some credit card companies automatically extend the warranty of a product that was purchased with a credit card issued by the credit card company. By storing the credit card number used during the original purchase along with the warranty information for the product recorded in the e-receipt, the user of the card has a convenient record of the length of an automatically extended warranty.

Of course, the e-receipt is not necessary to automatically give the user a warning when the warranty on an item purchased is coming to the end. That is, another aspect of the present invention is to provide reminders regarding extended warranty offers to customers who have purchased good/services. In one embodiment the warranty reminder is located on the customer's card. Optionally, the warranty information about the goods/services is located at a central database, which may be managed by the merchant or service provider. After a predetermined time passes, such a warranty reminder is presented automatically to a customer, that is, without requiring the customer to take active steps related to an extended warranty or reminders therefore. For example, a customer would not have to actively seek out information that would trigger a warranty offer or actively seek out a warranty offer itself. A customer would likewise not have to rely on accessing a web site in order to trigger receiving a warranty reminder or a warranty offer. Additionally, a customer would not need to be subject to electronic interrogation in order to receive a warranty reminder or warranty offer. Moreover, there would be no need for a customer to send e-mail correspondence to inquire or seek out information regarding warranty offers.

In an embodiment, travel information (e.g., itinerary, boarding pass, travel documents, travel history, etc.) can be stored on the card and, if desired, can be downloaded to a customer's electronic device (e.g., smart phone, tablet, slate, laptop, etc.). Optionally, the travel information may be wirelessly interrogated via a scanner or like kiosk for validating the travel information. As an example, the downloaded travel information (e.g. boarding pass, etc.) can include identifying information such as, for example, an optical pattern (e.g., a bar code), a particular signal (e.g., an RFID signal or other near field communication signal), user information (e.g., a photograph of the user, a description of the user, or any other suitable information). The downloaded boarding pass may then be read by a suitable sensor of the airport (e.g., a scanner to read the barcode or a receiver to receive the RFID signal) to authorize the user to, for example, board a plane, pass through security, or the like. In this manner, merchants/service provider may provide automatic marketing incentives/offers to customers based on their travel patterns/habits. Of course, each customer may opt-in or opt-out of having such travel information shared with merchants/service providers.

Other configurations for data processing systems may be used for writing and reading information to and from the card. For example, a handheld portable device may contain a scanner unit through which the card may be swiped. A person delivering some type of goods that have been previously purchased could require that a person accepting the delivery must present the card with a proper e-receipt. Once the handheld device authenticates the e-receipt, the goods may be delivered, at which point the card may be swiped a second time so that the actual delivery of the goods may be recorded onto the card. At the same time, the handheld device creates a record that is either stored and later downloaded to the merchant's main system or that is wirelessly transmitted to the merchant's main system so that the main system may update inventory records and reconcile the delivery of the goods with the original purchase transaction.

While the disclosure has been described with respect to a certain specific embodiment, it will be appreciated that many modifications and changes may be made by those skilled in the art without departing from the spirit of the disclosure. It is intended, therefore, by the appended claims to cover all such modifications and changes as fall within the true spirit and scope of the disclosure. In particular, with respect to the above description, it is to be realized that the optimum dimensional relationships for the parts of the present disclosure may include variations in size, materials, shape, form, function and manner of operation.

What is claimed as new and what is desired to secure by Letters Patent of the United States is:

1. A method for facilitating a secure commercial transaction, said method comprising the step of:
   providing a transactional device including a microprocessor, a data memory storage, and a transmitter;
   confirming a user identification of said transaction device and thereby activating operation of said transaction device, wherein said transactional device is a portable transactional device capable of being carried by a user having said user identification;
   wherein the step of confirming said user identification comprises
      receiving a user input of a first operational signal and comparison of said user input with a first operational user identification data stored in said data memory storage on said transactional device for activation of a first operational mode, and
      receiving a user input of a second operational signal and comparison of said user input with a second operational user identification data stored in said data memory storage on said transactional device for activation of a second operation mode; and
   receiving, from said second operation mode of said transactional device, an automated transmission initiated from said transmitter.

2. The method of claim 1, wherein the transactional_device is one of: an electronic card; an ATM card; a laptop; a portable media player; a tablet computer; a PDA; a mobile computer; and a mobile telephone.

3. The method of claim 1, wherein said first operational user identification data is a first personal identification number and wherein said second operational identification data is a second personal identification number.

4. The method of claim 1, wherein said second operation mode of said transactional device initiates transmission of an automated emergency notification alert message to an emergency service provider.

5. The method of claim 1, wherein said automated transmission initiated by said second operation mode of said transactional device directs a camera at a location proximate said transaction device to function according to high resolution parameters.

6. The method of claim 1, wherein said automated transmission initiated by said second operation mode of said transactional device directs a camera at a location proximate said transactional device to retain image data in a protected format.

7. The method of claim 1, wherein said automated transmission initiated by said second operation mode of said transactional device directs a camera at a location proximate said transactional device to email image data to a remote location.

8. The method of claim 1, wherein said transactional device further comprises a biometric reader, and wherein said first operational user identification data is a first biometric data and wherein said second operational identification data is a second biometric data.

9. The method of claim 1, wherein said transactional device is a card, and wherein said card further comprises no visible data.

10. The method of claim 1, wherein said first operation mode of said transactional device enables a transaction, wherein data from said transaction is stored in said data memory storage of said transactional device, and wherein said data from said transaction is retrievable.

11. The method of claim 1, wherein said first operation mode of said transactional device enables a transaction, and wherein data from said transaction is transmitted via email.

12. The method of claim 11, wherein said transaction of said first operation mode is an e-receipt for a purchase made by the user.

13. The method of claim 12, wherein said transaction of said first operation mode is a marketing offer for the user.

14. A secure commercial transaction system comprising:
   a transactional device having a microprocessor and data memory storage for confirming a user identification and thereby enabling operation of said transactional device;
   wherein said transactional device is capable of performing said user identification confirmation upon receiving a user input of either a first operational signal and a comparison of said user input with a first operational user identification data stored in said data memory storage on said transactional device for activation of a first operational mode, or user input of a second operational signal and comparison of said user input with a second operational user identification data stored in said data memory storage on said transactional device for activation of a second operation mode; and
   wherein said first operation mode of said transactional device enables a first transaction;
   wherein data from said first transaction is stored in said data memory storage of said transactional device;
   wherein said data from said first transaction is retrievable;

wherein said data from said first transaction is also transmitted via email;

wherein said second operation mode of said transactional device enables a second transaction;

wherein data from said second transaction is stored in said data memory storage of said transactional device;

wherein said data from said second transaction is retrievable; and wherein upon retrieval of said data from said first and second transactions from said data memory storage of said transactional device, comparative assessment of said first and second transactional data may occur.

15. The secure commercial transaction system of claim 14, wherein said transactional device is programmed to track use details relevant to facilitating direct marketing targeted to the user of the transactional device.

16. The secure commercial transaction system of claim 14, wherein said transactional device is adapted for operative direction of a transaction utilizing a platform selected from the group consisting of a commercial transaction machine, an automated teller machine, a point of purchase machine, a transaction site personal computer, a vehicle broadcast reception device, and a handheld card reader device.

17. The secure commercial transaction system of claim 14, further comprising a receiver and transmitter device functionally related to said transactional device, wherein said second operation mode of said transactional device initiates a transmission from said transactional device to said related receiver and transmitter device, wherein said receiver and transmitter device broadcasts an automated emergency notification alert message.

18. The secure commercial transaction system of claim 14, wherein said transaction is selected from the group consisting of a tracking transaction for location of an individual or vehicle and a medical transaction.

19. The secure commercial transaction system of claim 14, wherein after a transaction according to said second operation mode, said transactional device is rendered inoperable.

20. The secure commercial transaction system of claim 14, wherein said transactional device further comprises a plurality of credit card account's data, and wherein a transaction is selectively related to one of said plurality of credit card accounts.

* * * * *